US011958574B2

(12) United States Patent
Ambler (10) Patent No.: US 11,958,574 B2
(45) Date of Patent: Apr. 16, 2024

(54) REMOTE POSITION MANAGEMENT (71) Applicant: Rhodan Marine Systems of Florida, LLC, Sarasota, FL (US)

(72) Inventor: Lindsay Ambler, Myakka City, FL (US)

(73) Assignee: Rhodan Marine Systems of Florida, LLC, Sarasota, FL (US)

( * ) Notice: Subject to any disclaimer, the term of this patent is extended or adjusted under 35 U.S.C. 154(b) by 236 days.

(21) Appl. No.: 17/180,177

(22) Filed: Feb. 19, 2021

(65) Prior Publication Data

US 2022/0063772 A1   Mar. 3, 2022

Related U.S. Application Data

(60) Provisional application No. 62/980,705, filed on Feb. 24, 2020.

(51) Int. Cl.
*B63B 35/00* (2020.01)
*B63H 25/02* (2006.01)
(Continued)

(52) U.S. Cl.
CPC ............ *B63B 35/00* (2013.01); *B63H 25/02* (2013.01); *B63H 25/46* (2013.01); *G05D 1/0208* (2013.01);
(Continued)

(58) Field of Classification Search
CPC .............................. B63B 35/00; G05D 1/0206
See application file for complete search history.

(56) References Cited

U.S. PATENT DOCUMENTS

| 5,491,636 A | 2/1996 | Robertson et al. |
| 6,273,771 B1 | 8/2001 | Buckley et al. |
| (Continued) | | |

FOREIGN PATENT DOCUMENTS

| EP | 3214521 A1 | 9/2017 |
| EP | 3214523 A1 | 9/2017 |
| (Continued) | | |

OTHER PUBLICATIONS

PCT/US2021/018756 International Preliminary Report on Patentability dated Aug. 30, 2022.
(Continued)

*Primary Examiner* — Jeff A Burke
*Assistant Examiner* — Christopher A Buksa
(74) *Attorney, Agent, or Firm* — Goodwin Procter LLP (57) ABSTRACT

The application relates to systems and techniques for remotely navigating a marine vessel. The systems can include a dynamic positioning system and/or a marine location management system for remotely navigating a marine vessel. The marine location management system can include a communication module for receiving a geographic location of the marine vessel and transmitting a navigation plan to a vessel control system. The marine location management system can also include a processor adapted to determine the geographical coordinates of the marine location and the marine vessel. In some cases, the marine vessel can include a thruster system adapted to receive the navigation plan and determine a set of thrust vectors based on the navigation plan.

17 Claims, 5 Drawing Sheets

(51) Int. Cl.
    *B63H 25/46* (2006.01)
    *G05D 1/00* (2006.01)
    *G05D 1/02* (2020.01)

(52) U.S. Cl.
    CPC ..... *B63B 2035/008* (2013.01); *B63B 2213/02* (2013.01); *B63H 2025/028* (2013.01)

(56) References Cited

U.S. PATENT DOCUMENTS

| | | |
|---|---|---|
| 6,678,589 B2 | 1/2004 | Robertson et al. |
| 9,694,885 B2* | 7/2017 | Combee .................. B63G 8/42 |
| 2003/0191562 A1 | 10/2003 | Robertson et al. |
| 2016/0016651 A1 | 1/2016 | Anderson et al. |
| 2017/0255201 A1* | 9/2017 | Arbuckle ................. B63J 99/00 |
| 2018/0029431 A1* | 2/2018 | Tang ................... B62K 15/006 |
| 2019/0047675 A1 | 2/2019 | Clark |
| 2019/0179318 A1* | 6/2019 | Miller .................. G05D 1/0208 |
| 2020/0128353 A1* | 4/2020 | Waldrop ............. G06F 16/2477 |
| 2020/0150677 A1* | 5/2020 | Walters ................. B63H 25/04 |

FOREIGN PATENT DOCUMENTS

| | | |
|---|---|---|
| WO | WO-2017168234 A1 | 10/2017 |
| WO | WO-2021173441 A1 | 9/2021 |

OTHER PUBLICATIONS

PCT/US2021/018756 International Search Report and Written Opinion dated Jun. 4, 2021.

\* cited by examiner

REMOTE POSITION MANAGEMENT

CROSS-REFERENCE TO RELATED APPLICATION

This application claims priority to and the benefit of U.S. Provisional Application No. 62/980,705 titled "Remote Position Management" and filed on Feb. 24, 2020, the entirety of which is incorporated herein by reference.

TECHNICAL FIELD

The following disclosure is directed to methods and systems for remotely navigating a marine vessel to a marine location and, more specifically, methods and systems for remotely navigating the marine vessel to the marine location by transmitting a navigation plan to the vessel based on the geographical locations of the marine location and the marine vessel and determining thrust vectors based on the navigation plan.

BACKGROUND

Operators of marine vessels often encounter challenges when approaching marinas, docks, or other locations for docking their vessels. Operators routinely experience trouble navigating to a designated location to park their vessels. Further, the manager of a marina, mooring field, etc. may designate a location for the marine vessel that may not be optimal for docking or moorage based on the particular position of the approaching vessel.

SUMMARY

Described herein are systems and methods for remotely navigating a marine vessel to a marine location. In some embodiments, a marine location management system is adapted to communicate with a control system of the marine vessel to guide the vessel to the location. For instance, the marine location management system can determine and communicate a navigation plan to enable a trolling motor of the vessel to navigate to the designated location. The vessel's control system can determine a set of thrust vectors for the trolling motor. In some cases, this can provide a more precise approach path for the operator of the vessel, thereby providing a safer and more efficient docking experience. In some embodiments, the systems and methods described herein can enable a more efficient marina, mooring field, or harbor management by preventing traffic or dangerous situations for multiple marine vessels approaching at similar times and/or locations and/or by allocating locations in a more efficient or effective manner.

In general, in one aspect, embodiments of the invention feature a dynamic positioning system for remotely navigating a marine vessel to a marine location characterized by geographical coordinates. The dynamic positioning system can include (i) a marine location management system that includes a storage medium adapted to store geographical coordinates of at least one marine location, a communication module adapted to receive a geographical location of the marine vessel and transmit a navigation plan to the vessel control system to direct the marine vessel to one of the at least one marine location, and a processor, in communication with the storage medium and the communication module, adapted to determine the navigation plan based on the geographical coordinates of the at least one marine location and the geographical location of the marine vessel; and (ii) a thruster system coupled to the marine vessel that includes at least one trolling motor and a controller adapted to (a) receive the navigation plan from the communication module, (b) determine a set of thrust vectors based on the navigation plan, and (c) control the at least one trolling motor based on the set of thrust vectors to steer the marine vessel to the at least one marine location.

In various embodiments, the controller is adapted to control steering direction and/or a thrust magnitude of the at least one trolling motor to maintain a substantially constant position of the marine vessel to a positional accuracy of up to about 1 meter. The communication module can receive the geographical location from a cloud based network which receives the geographical location from the vessel control system of the marine vessel. The at least one marine location can be located within a marina, a mooring field, and/or a lock. In some instances, the at least one marine location can include at least one available location and at least one unavailable location for marine vessels. In such instances, the processor can be adapted to designate an available location of the at least one available location to the marine vessel and determine the navigation plan to direct the vessel to the designated available location.

In general, in another aspect, embodiments of the invention feature a method for remotely navigating a marine vessel to a marine location. The method can include the steps of receiving, by a communication module of a marine location management system, geographical coordinates of at least one marine location; receiving, by the communication module, a geographical location of the marine vessel; determining, by a processor in communication with the communication module, a navigation plan based on the geographical coordinates of the at least one marine location and the geographical location of the marine vessel; transmitting, by the communication module, the navigation plan to a vessel control system of the marine vessel to direct the marine vessel to one of the at least one marine location; determining, by the vessel control system, a set of thrust vectors based on the navigation plan; and transmitting, by the vessel control system to at least one trolling motor of the marine vessel, the set of thrust vectors.

In various embodiments, the marine location is located within a marina, a mooring field, and/or a lock. In some instances, the method further includes the step of storing, by a storage medium coupled to the processor, the geographical coordinates of the at least one marine location. The step of receiving, by the communication module, the geographical location of the marine vessel can include receiving the geographical location from a cloud-based network which receives the geographical location from the vessel control system of the marine vessel. In some instances, the at least one marine location includes at least one available location and at least one unavailable location for marine vessels and the method further includes the steps of (i) designating, by the processor, an available location of the at least one available location to the marine vessel, and (ii) determining, by the processor, the navigation plan to direct the vessel to the designated available location.

In general, in another aspect, embodiments of the invention feature a marine location management system for remotely navigating a marine vessel, the marine location management system being located remote from the marine vessel and adapted to communicate with a vessel control system of the marine vessel. The marine location management system can include a storage medium adapted to store geographical coordinates of at least one marine location; a communication module adapted to receive a geographical location of the marine vessel and transmit a set of thrust vectors to the vessel control system to direct the marine vessel to one of the at least one marine location; and a processor, in communication with the storage medium and the communication module, adapted to determine the set of thrust vectors based on the geographical coordinates of the at least one marine location and the geographical location of the marine vessel.

In various embodiments, the communication module is adapted to receive the geographical location from a cloud-based network which receives the geographical location from the vessel control system of the marine vessel. The at least one marine location can be location within a marina, a mooring field, and/or a lock. In some instances, the at least one marine location can include at least one available location and at least one unavailable location for marine vessels. In such instances, the processor can be adapted to designate an available location of the at least one available location to the marine vessel and determine the navigation plan to direct the vessel to the designated available location.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Disclosed herein are exemplary embodiments of systems and methods for remotely navigating a marine vessel. The exemplary systems can include a marine location management system adapted to communicate with a control system of a marine vessel. The exemplary systems can be used to remotely navigate a marine vessel to a marine location within a grouping of marine locations, e.g., a position alongside a dock, in a lock, a position in a slip or berth of a pier, a wharf, a marina, etc.; a site in a mooring field or port; etc. As used herein, "a marine location" typically refers to a position or space (e.g., slip, berth, site, etc.) for an individual marine vessel while "grouping of marine locations" is used to refer to a collection of two or more marine locations (e.g., a marina, dock, mooring field, wharf, pier, etc.).

Figure 1:
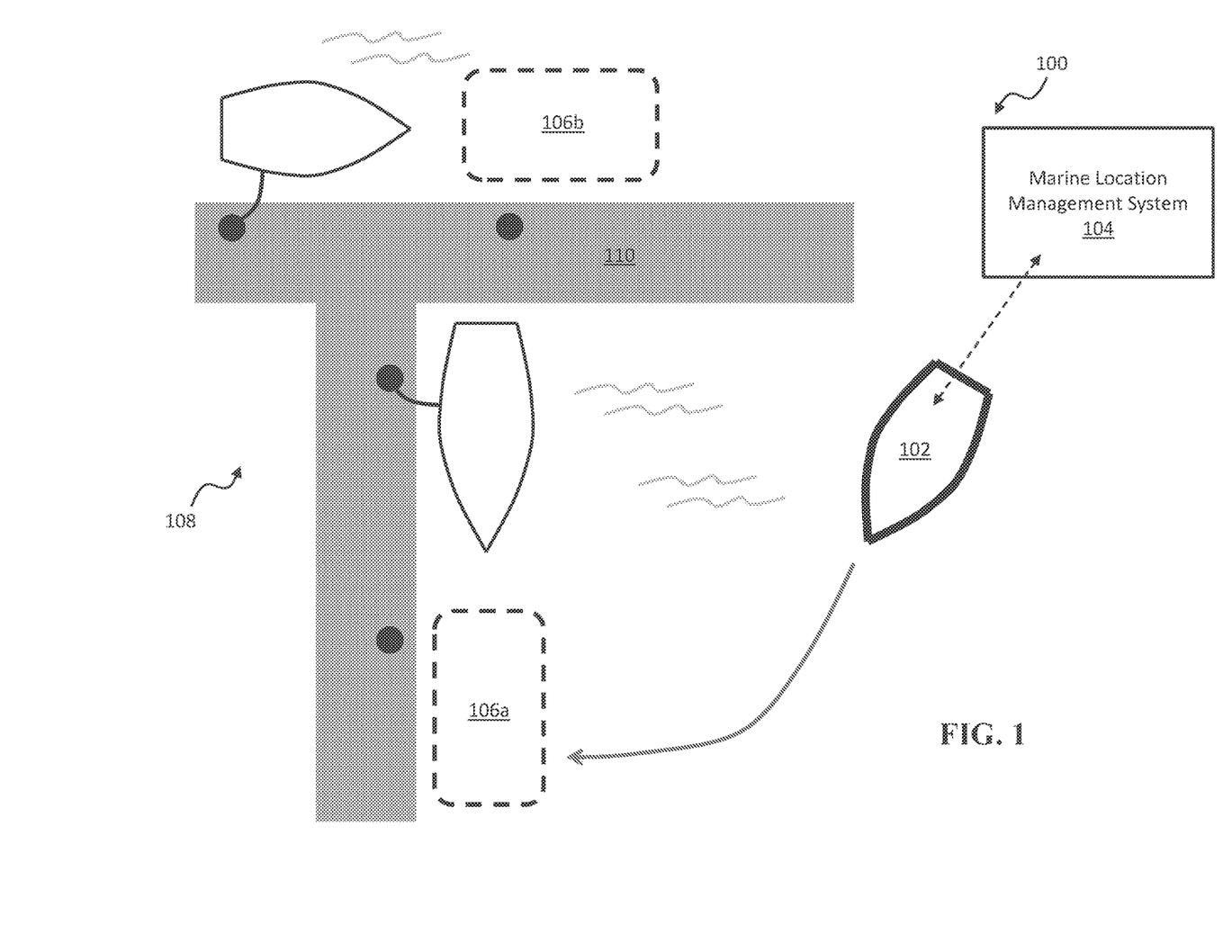
FIG. 1 is a diagram of an exemplary scenario depicting remote navigation by a marine location management system of a marine vessel to a marine location.

FIG. 1 illustrates an exemplary scenario 100 for remotely navigating a marine vessel 102 to a marine location (e.g., location 106a, location 106b, etc. of marina 108) with a marine location management system 104. In scenario 100, marine vessel 102 is seeking an available space to "park."

Exemplary marine location management system 104, e.g., located remotely from the vessel 102, can be configured to communicate with the vessel 102. The system 104 can be located at or near the marine location(s) or remote from the marine location(s). For example, the system 104 can be located in a building used to manage the marina 108. In some embodiments, the system 104 need not be physically present in the marina 108 but can be cloud-based, hosted by a remote server system, and/or accessed by a web portal. In some embodiments, the system 104 can be configured to guide the vessel 102 to a determined marine location (e.g., location 106a), as described further herein.

Figure 2:
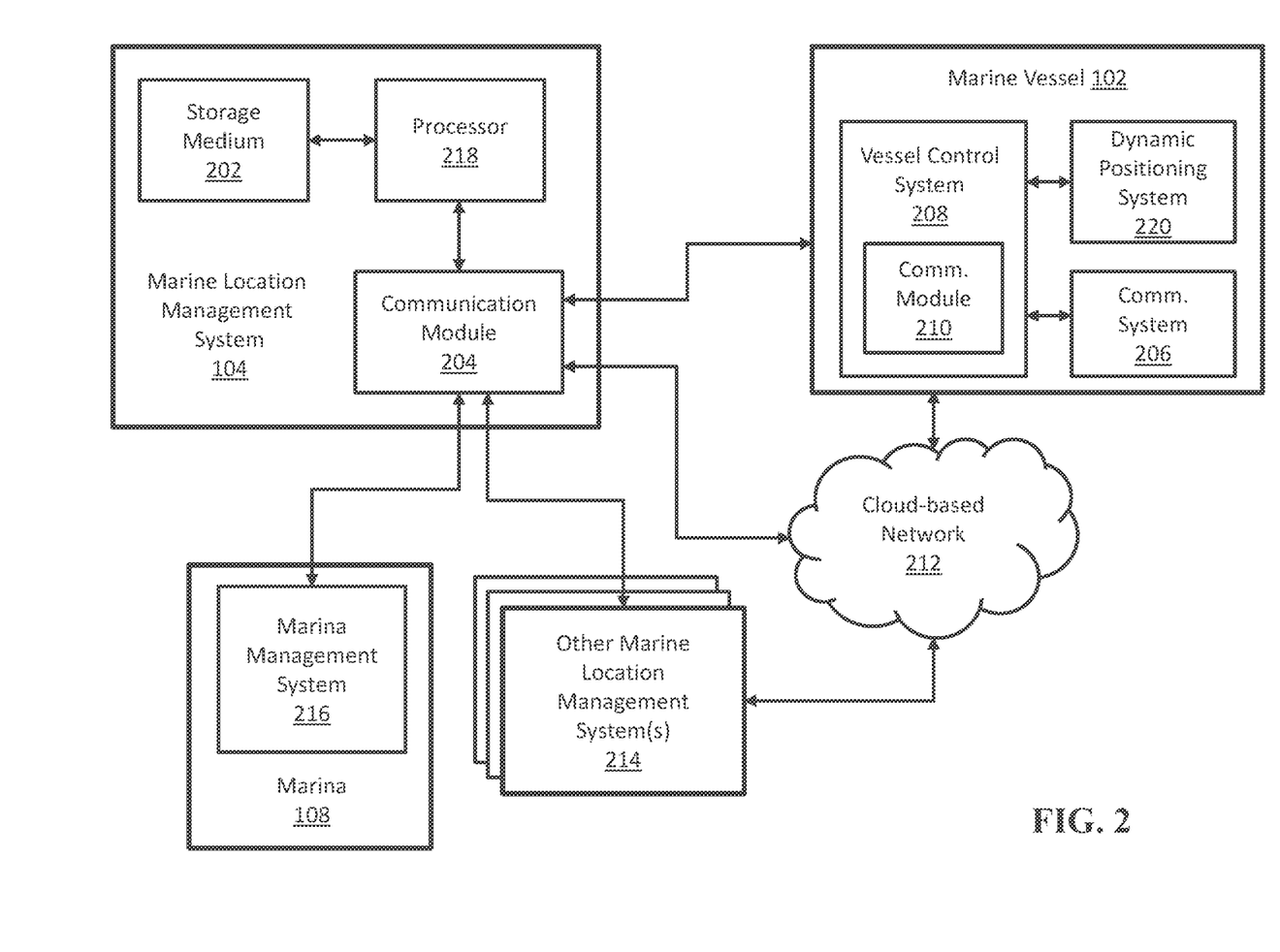
FIG. 2 is a block diagram of an exemplary marine location management system for remotely navigating a marine vessel.

FIG. 2 is a block diagram illustrating an exemplary marine location management system 104 for remotely navigating a marine vessel 102. The exemplary system 104 can include a storage medium 202 that can store geographical coordinates (e.g., latitude and longitude) of at least one marine location. In some embodiments, the storage medium 202 can store a plurality of marine locations (e.g., two, three, five, tens of locations, hundreds of locations, thousands of locations, etc.). For example, the storage medium 202 can store various numbers of marine locations depending on the size of a marina or mooring field. In another example, the storage medium 202 can store marine locations by grouping. For instance, the medium 202 can store the geographical coordinates of a first set of slips in Marina A, a second set of slips in Marina B, and so on. Therefore, the marine location management system 104 may be configured to manage multiple groupings of marine locations (e.g., multiple marinas, mooring fields, etc.). In some examples, the management of multiple groupings may be realized by a system 104 that is cloud-based.

The exemplary system 104 can include a communication module 204 that is adapted to receive the geographical location of a marine vessel (e.g., vessel 102). The communication module 204 can include typical marine vessel 102 on-board communication systems 206 that enable communication by the vessel 102 with a remote entity, for example, ship-to-ship or ship-to-shore (e.g., other vessels, a harbor-master, marina management systems, etc.). These communication systems 206 can utilize in general any suitable communication technique, e.g., radio, radar, satellite, Internet connection, etc. In some embodiments, communication systems 206 can include one or more of a radio unit (e.g., single-sideband radio (SSB), SailMail, etc.), satellite service (e.g., by Inmarsat (London, England, United Kingdom) or Iridium (McLean, Va.), etc.). In some embodiments, the vessel's communication system 206 may be coupled to the control system 208 of the vessel 102. In some embodiments, the vessel control system 208 can include a dedicated communication module 210 configured to communicate the vessel's geographical location. In some embodiments, the vessel 102 (via communication system 206 or communication module 210) can transmit its geographical location to a cloud-based network 212 and the communication module 204 can receive the geographical location of the vessel 102 via the network 212.

In some embodiments, the communication module 204 may be configured to communicate with other external systems to coordinate the guiding of the marine vessel 102 to an available marine location. For example, if all of the slips (marine locations) of Marina A are unavailable, the marine location management system 104 may guide the vessel 102 to an available slip of another marina nearby. In some embodiments, the communication module 204 of system 104 may communicate with other (separate) marine location management systems 214 configured to manage other marine locations. This can be useful, for example, in coordinating the guiding of marine vessels to marinas that do not share a common owner. In some embodiments, the communication module 204 can be configured to communicate with marina management system(s) 216 (e.g., Dock-Master, AnchorSoft, BiT Marine Software, etc.) that typically manage membership, storage, billing, scheduling, customer reviews, labor tracking, fuel sales, etc. for a particular marina 108. For example, once the marine location management system 104 has successfully guided the marine vessel 102 to an available marine location 106a, the system 104 may communicate with the marina management system 216 to determine, for example, cost of the location for a particular amount of time, the cost of refueling, marina amenities, etc.

The exemplary system 104 can include a processor 218 coupled to the storage medium 202 and communication module 204. The processor 218 can be adapted to determine a navigation plan for the marine vessel 102 based on the geographical coordinates of the marine location (e.g., location 106a) and the geographical location of the marine vessel 102. In general, the navigation plan can include any information that can be used to navigate the marine vessel 102 to a desired location 106; for example, an approach path, a center line path, boundaries for a channel, etc. for the vessel 102. The navigation plan can include one or more sensor inputs from the vessel 102. The communication module 204 can transmit the set of thrust vectors to the control system 208 of the marine vessel 102 so as to direct the vessel 102 to the marine location. The control system 208 can provide the set of thrust vectors to the dynamic positioning system 220 of the marine vessel 102, as described further below.

In some embodiments, the marine location management system 104 can be configured to take inputs from the marine vessel 102, in addition to or separate from the vessel's geographical location. For example, the owner or operator of the marine vessel 102 may have preferences for a particular type of marine location based on amenities, location, etc. For example, the owner may provide her preference for a marine location with Wi-Fi to the marine location management system 104 and the system 104 may select an available position based on the owner's preference. In some embodiments, the marine location management system 104 may override the owner's preference if it conflicts with safety conditions, available positions, etc. For example, if the owner requires a particular position on the side of a pier, the system 104 may determine that the particular side will be unsuitable or that another vessel may be en route to that particular position. In some embodiments, the system 104 and/or owner of the vessel 102 may choose to cancel or interrupt the interaction between the system 104 and the vessel control system 208.

In some embodiments, the marine location management system 104 can be configured to store user accounts for the owners of the marine vessels 102. This can be advantageous in storing the particular preferences of the owners and/or characteristics of the marine vessel 102. For example, the selection of marine location can depend on the size and/or type of the marine vessel 102. Further, the set of thrust vectors that are determined by the processor 218 can depend on the size, type, etc. of the marine vessel 102.

Figure 3:
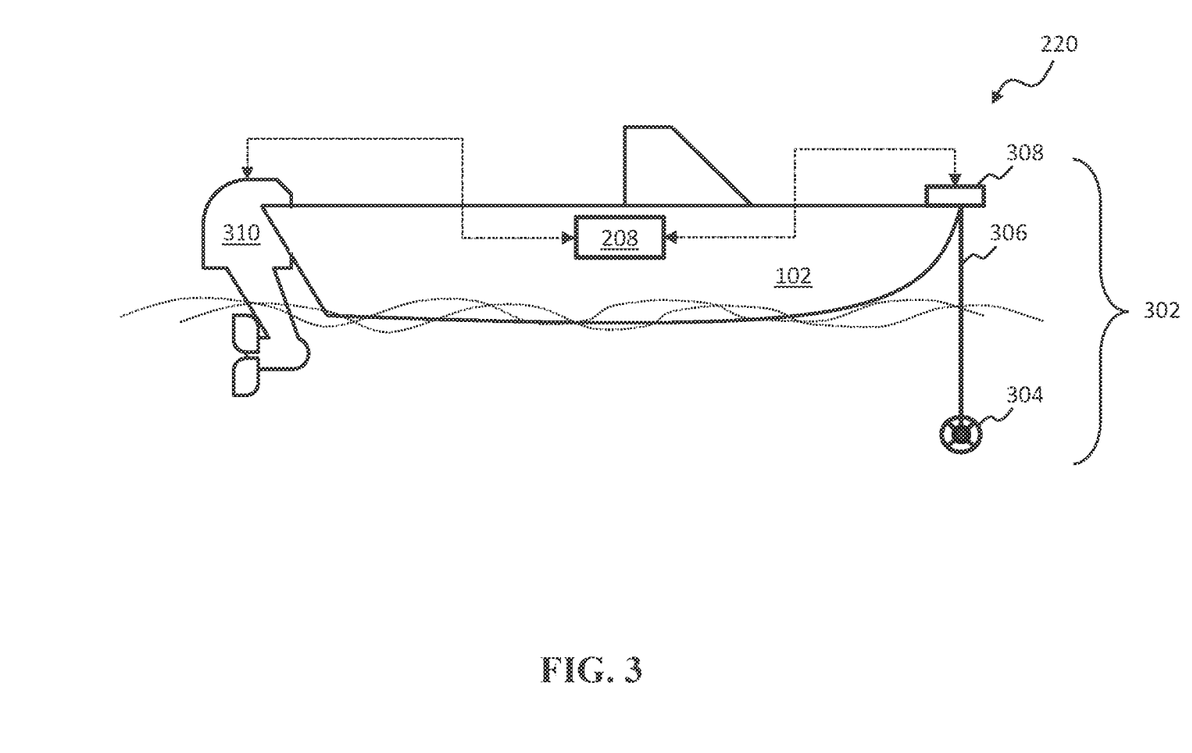
FIG. 3 is a diagram of an exemplary marine vessel configured to interface with the marine location management system.

FIG. 3 illustrates an exemplary dynamic positioning system 220 for positioning a marine vessel 102. Examples of boat positioning and anchoring systems can be found in U.S. Pat. No. 5,491,636, issued on Feb. 13, 1996 and titled "Anchorless boat positioning employing global positioning system," and U.S. Pat. No. 6,678,589, issued on Jan. 13, 2004 and titled "Boat positioning and anchoring system," both of which are incorporated herein by reference in their entireties. The exemplary dynamic positioning system 220 can include a thruster system 302, which includes trolling motor 304 that provides thrust for the marine vessel 102. In the exemplary embodiment shown in FIG. 3, the motor 304 (e.g., a brushed DC motor, brushless DC motor, etc.) is coupled to a bow-mounted shaft 306. The shaft 306 is coupled to the vessel 102 via a coupling mechanism 308. In some embodiments, the coupling mechanism 308 can include the power and/or control electronics configured to power and/or control the trolling motor 304. In this case, the received set of thrust vectors can be communicated from the vessel control system 208 to the controller in mechanism 308 to cause the motor 304 to change the direction and magnitude of thrust according to the set of thrust vectors. Note that, in some embodiments, the vessel control system 208 can be coupled to the main motor 310 of the vessel 102.

Positional Accuracy

In some embodiments, the controller can be adapted to control at least one of a steering direction or a thrust magnitude of the at least one trolling motor to maintain a substantially constant position of the marine vessel to a positional accuracy of up to about 1 meter. Descriptions of exemplary systems and methods for maintaining positional accuracy of a marine vessel can be found in U.S. Pat. No. 6,678,589, issued on Jan. 13, 2004 and titled "Boat positioning and anchoring system". For instance, the positioning system can include a differential global positioning satellite (DGPS) receiver located aboard the vessel for receiving, via antenna, course acquisition code (C/A-code) signals transmitted at a frequency of 1575.42 MHz from orbiting GPS satellites. C/A-code is also often referred to as civilian accuracy code to distinguish it from the longer P-code which provides higher position resolution but is restricted for use by the Department of Defense. Receiver is a DGPS MAX receiver by CSI Wireless, Inc. in Calgary, Alberta, Canada. The navigation processing memory functions performed by the DGPS receiver include satellite orbit calculations and satellite selection, atmospheric delay correction calculations, navigation solution compotation, clock bias and rate estimates, computation of output information and coordinate conversation of the position information.

The accuracy in calculating the position, time and velocity parameters by the receiver is significantly improved using differential GPS (DGPS) techniques. This technique involves the use of a DGPS reference station (not shown) operating at a surveyed location, generally onshore. The reference station includes a DGPS reference receiver which may be of the same type a receiver, for receiving signals from satellites and computing satellite pseudo range correction data using prior knowledge of the correct satellite pseudo ranges. The satellite pseudo range correction data is converted to radio frequency shift modulated signals with reference station modem and then broadcast to users within communication range in the same geographic area with a transmitter over a radio digital data link. The pseudo range corrections are received by the receiver aboard the vessel and demodulated with a radio as digital data link. These corrections are incorporated into the calculation of the navigation solution and to correct for the observed satellite pseudo range measurements, thereby improving the accuracy of the position determination to within 2-5 meters or better.

In the FAA Wide Area Augmentation System (WAAS), the corrected differential message is broadcast through one of two geostationary satellites, or satellites with a fixed position over the equator. The information is compatible with the basic GPS signal structure, which means any WAAS-enabled GPS receiver can read the signal. Better quality WAAS-enabled GPS receivers can achieve an accuracy within one meter.

Figure 4:
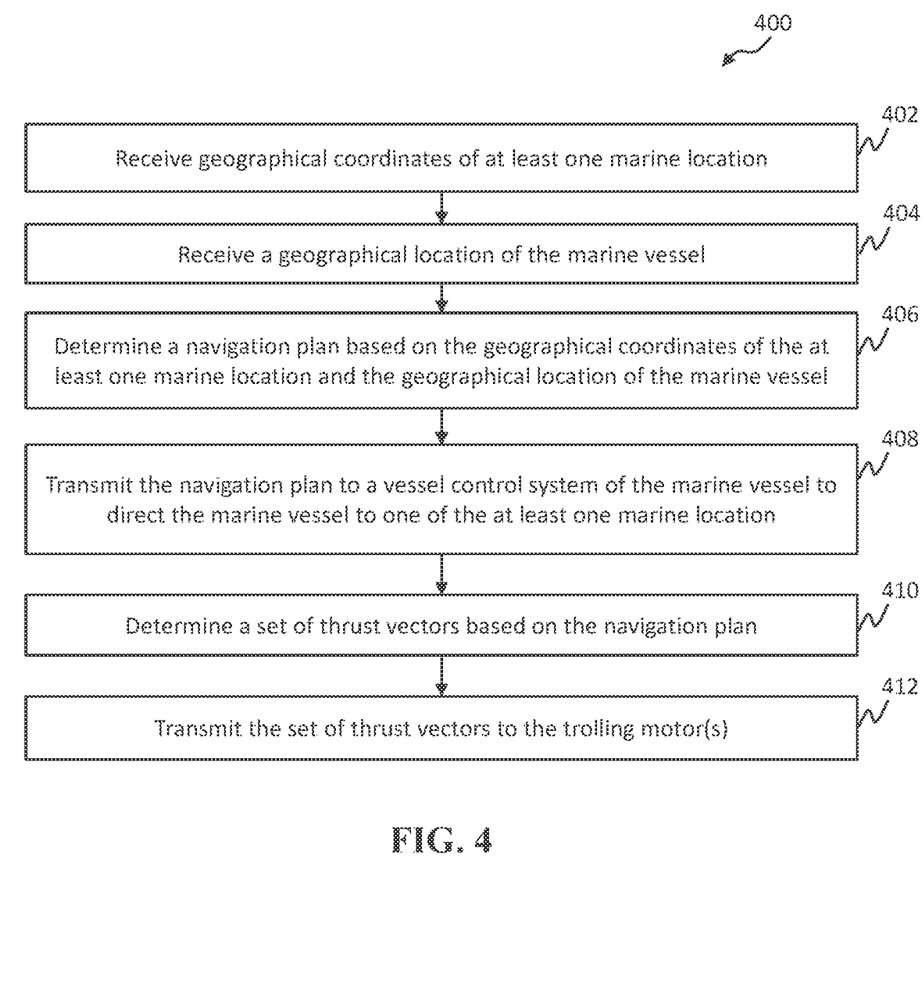
FIG. 4 is a flowchart of an exemplary method for remotely navigating a marine vessel to a marine location.

FIG. 4 illustrates an exemplary method 400 for remotely navigating a marine vessel 102 to a marine location. In step 402 of the exemplary method 400, the marine location management system 104 receives geographical coordinates of one or more marine locations. In some embodiments, the coordinates are received by the communication module 204 and stored in a storage medium 202. In some embodiments, the communication module 204 can receive the geographical coordinates from a marina management system 216 or an owner/manager of the grouping of marine locations.

In step 404, the communication module 204 receives a geographical location of the marine vessel 204, as described in detail above. In some embodiments, the vessel control system 208 of the marine vessel 102 transmits the geographical location to the communication module 204. In some cases, the communication module 204 and vessel control system 208 (or, alternatively, communication system 206 of the vessel 102) are in communication with a cloud-based network 212. The communication module 204 can receive the geographical location from this cloud-based network 212 which receives the geographical location from the vessel control system 208 (or, alternatively, communication system 206 of the vessel 102). The geographical coordinates of the marine vessel 102 may be determined by any suitable technology, e.g., a global positioning system (GPS) unit aboard the vessel 102 that is configured to receive position signals from a GPS satellite. This may include a mobile device that includes a GPS unit. In some cases, the geographical coordinates may be determined by a wide area augmentation system (WAAS)-enabled unit, a local area augmentation system (LAAS)-enabled unit (also known as a ground-based augmentation system (GBAS)), and/or other satellite-based augmentation system (SBAS). In some embodiments, the vessel 102 can include sensors on the exterior and/or interior of the vessel that are configured to output one or more properties of the specific vessel (e.g., size, shape, weight, position, speed, how the vessel will drift, specific center of gravity, etc.)

In step 406 of the exemplary method 400, a processor 218 determines a navigation plan based on the geographical coordinates of the marine location(s) (e.g., locations 106a, 106b, etc.) and the geographical location of the marine vessel 102. The processor 218 can compare the geographical location of the vessel 102 to the available marine location(s) to determine the magnitude and direction of the thrust required to guide the vessel 102 to the location 106a. The following describes a non-limiting example of determining a set of thrust vectors as used in one or more of the remote position management methods described herein.

Proportional, Integral, and Derivative Control (PID)

The prior art virtual anchor system in U.S. Pat. No. 5,491,636 used a proportion and derivative (PD) control system. With the original PD control system, thrust output was equal to K1 times the range error minus K2 the times the range rate, where K1 and K2 are adjustable parameters. Thrust thus equals:

$$\text{Thrust} = K1*R - K2*R\text{dot}$$

If the disturbing force, wind or current required 20 pounds of thrust to cancel out any motion, the range rate Rdot goes to zero (20 pounds will be used for this discussion as the force required to achieve equilibrium.) Additionally if K1=5 and thrust is at 20 #, then the range error would stabilize a value of four meters.

In order to minimize the steady state error typical of Proportional Derivative (PD) control systems, an integral control term is added by taking a slow average of the range error with the averaging time constant adjusted by the value, Kavg. A modification was also made to the PD derived thrust. This was accomplished by adding additional thrust that is proportional to the average range error as follows:

$$\text{Thrust} = K1*R - K2R\text{dot} + K3*\text{Avg}R$$

If K3=2*K1, for example (a factor of two was chosen in the implementation), thrust now equals:

$$\text{Thrust} = 5*4 - 0 + 10*4 = 60\#$$

This is too much, so that boat moves closer.
At 2 Meters $$\text{Thrust} = 5*2 - 0 + 10*2 = 30\#$$

Still a bit too much.
At 1.5 Meters
At 2 Meters $$\text{Thrust} = 5*1.5 - 0 + 10*1.5 = 20\#$$

Just right . . . disturbing force is cancelled out.

Now the system achieves equilibrium at 1.5 meters instead of 4 meters from the target T.

Note that it is possible to have made K3=3 times K1 to achieve an even smaller range error at equilibrium. The system however must be such as to maintain system stability. The integral term can result in an oscillatory condition if the time constant is too small or the K3 value is too large.

Kavg=0.01 which means that the 63% averaging time constant is 100 seconds. The averaging equation is:

$$\text{AvgError} = \text{AvgError} + K\text{avg}*(\text{Error} - \text{AvgError})$$

This gives an exponential function versus time such that the average will integrate to 63 percent in one time constant or 1/Kavg seconds and will achieve almost 100 percent in approximately 5 time constants or 500 seconds.

A still further refinement in controlling thrust and steering angle of a bow thruster is the addition of a fourth independently adjustable constant, K4, modifying the bearing to a desired site or anchoring location as follows:

$$\text{Thrust} = [\{K1*\text{range}\} - \{K2*\text{range rate}\} + \{k3*\text{average range}\}][1 - K4*\text{Sine(bearing to site)}]$$

K Factors

K1, K2 and K3 are the basic control system PDI coefficients. K1 is selected based on the thruster size, boat parameters and magnitude of disturbing forces that the system should resist. K1 is the proportional gain coefficient.

K2 is selected to achieve desired dampening and control system stability; thus K2 is the derivative control coefficient.

K3 is selected to reduce the steady state error without jeopardizing system stability; thus K3 is the integral control coefficient.

K4 is selected to suit the boat dynamics in situations where significantly less force is required to yaw the bow of the vessel as compared to moving the vessel forward. Kavg is a fractional value selected to establish the averaging time constant for the average range error computation. Further examples of determining the set of thrust vectors can be found in U.S. Pat. No. 5,491,636, issued on Feb. 13, 1996 and titled "Anchorless boat positioning employing global positioning system", and U.S. Pat. No. 6,678,589, issued on Jan. 13, 2004 and titled "Boat positioning and anchoring system", both of which are incorporated by reference herein in their entireties. Note that, if there are two or more thrusters on the vessel 102, the set of thrust vectors can be adjusted accordingly.

In some embodiments, if there are two or more marine locations available (e.g., locations 106a and 106b), the processor 218 can determine the appropriate marine location for the vessel 102 using any suitable criteria, e.g., the distance between the vessel 102 and each of the locations 106a and 106b, accounting for any intervening obstacles. For example, in the scenario 100 shown in FIG. 1, vessel 102 is roughly equidistant between locations 106a and 106b. However, dock 110 is in the path directly connecting vessel 102 to location 106b and therefore would require a longer navigation path as compared to navigation path to location 106a. Therefore, location 106a appears to be a more desirable location for selection by the processor 218. In some embodiments, the processor 218 may select the marine location based on the vessel owner's preferences and/or characteristics of the marine vessel 102, as discussed above. In some embodiments, the marine location(s) can include one or more available location and one or more unavailable location for marine vessels. Therefore, in some embodiments, the exemplary method 400 can include designating, by the processor 218, an available location of the available location(s) to marine vessel 102. The processor 218 can determine a navigation plan to direct the vessel to the designated available location. In some embodiments, the processor 218 can determine a navigation plan that includes the set of thrust vectors.

In step 408, the communication module 204 can transmit the navigation plan to a vessel control system 208 of the marine vessel 102 to direct the vessel 102 to one of the marine locations 104. As discussed above, the received navigation plan can be communicated from the vessel control system 208 to a controller of the motor 304.

In step 410, the vessel control system can determine the set of thrust vectors based on received navigation plan. In step 412, the vessel control system can transmit the set of thrust vectors to one or more trolling motors of the marine vessel. The trolling motors (s) can change the direction and/or magnitude of thrust according to the set of thrust vectors, thereby navigating the vessel 102 to the marine location.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 5:
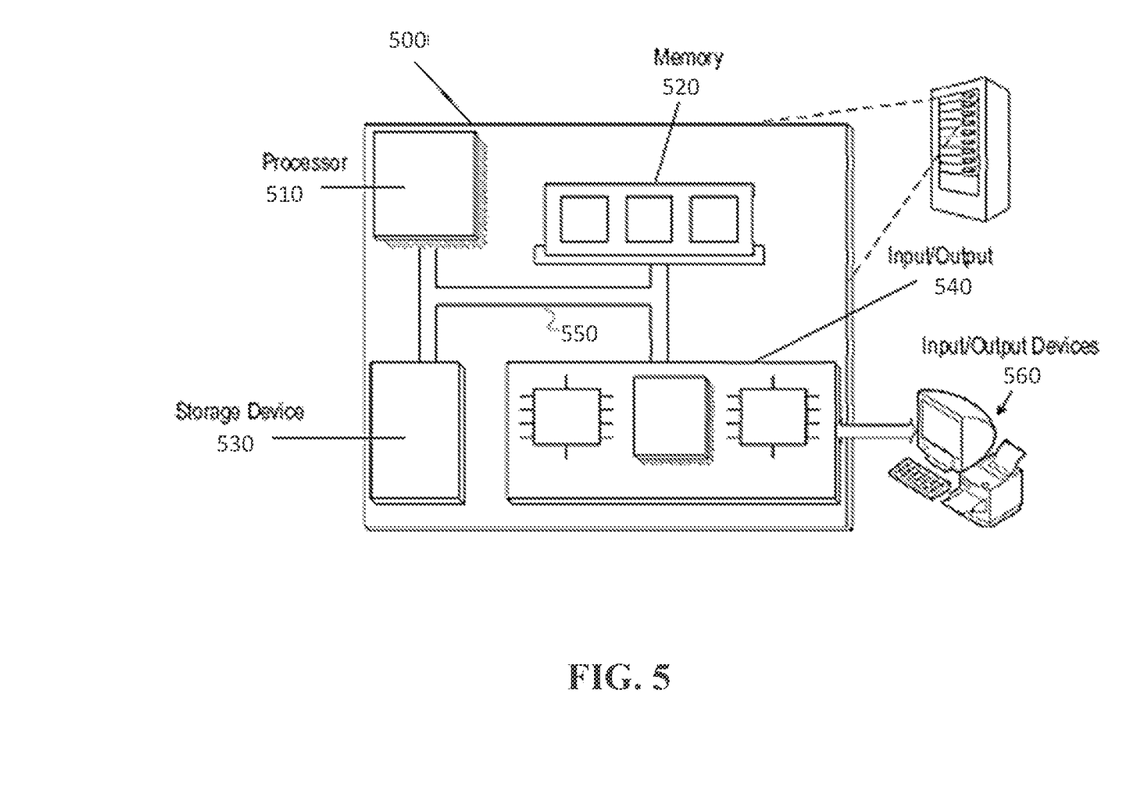
FIG. 5 is a block diagram of an example computer system that may be used in implementing the systems and methods described herein.

FIG. 5 is a block diagram of an example computer system 500 that may be used in implementing the technology described in this document. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-date drive, a flash drive, or some other large capacity storage device. For example, the storage device may store long-term data (e.g., database data, file system data, etc.). The input/output device 540 provides input/output operations for the system 500. In some implementations, the input/output device 540 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, such as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

What is claimed is:

1. A system for remotely navigating a marine vessel, the system comprising:
   a marine location management system located remote and separate from the marine vessel and comprising:
      a storage medium adapted to store geographical coordinates of at least one marine location, wherein the at least one marine location is located within a location selected from the group consisting of a marina, a mooring field, and a lock;
      a communication module adapted to receive a geographical location of the marine vessel; and
      a processor, in communication with the storage medium and the communication module, adapted to:
         determine at least one available location of the at least one marine location to receive the marine vessel, each available location associated with corresponding geographical coordinates;

determine a navigation plan based on the corresponding geographical coordinates of the at least one available location and the geographical location of the marine vessel; and identify an optimal available location of the at least one available location based on one or more selection criteria; and a vessel control system for controlling at least one motor located on the marine vessel, the vessel control system configured:

(i) to receive the navigation plan corresponding to the optimal available location determined by the processor, wherein one or both of the processor and the vessel control system are configured to calculate a set of thrust vectors based on the navigation plan; and (ii) control the at least one motor based on the set of thrust vectors to navigate the marine vessel to the optimal available location.

2. The system of claim 1, wherein the communication module is adapted to receive the geographic location from a cloud-based network which receives the geographic location from the vessel control system of the marine vessel.

3. . The system of claim 1, wherein the at least one marine location further includes at least one unavailable location for marine vessels.

4. The system of claim 1, wherein the controller is further adapted to control at least one of a steering direction or a thrust magnitude of the at least one trolling motor to maintain a substantiallyconstant position of the marine vessel to a positional accuracy of up to about 1 meter.

5. The system of claim 1, wherein the selection criteria comprise i) the navigation plan of each available location, ii) one or both of a size and type of the marine vessel, iii) a marine vessel owner or operator preference, iv) or a combination thereof.

6. A method for remotely navigating a marine vessel, the method comprising:

receiving, by a communication module of a marine location management system located remote and separate from the marine vessel, geographical coordinates of at least one marine location, wherein the at least one marine location is located within at least one of a marina, a mooring field, or a lock;

receiving, by the communication module, a geographical location of the marine vessel;

determining, by a processor in communication with the communication module, at least one available location of the at least one marine location to receive the marine vessel, each available location associated with corresponding geographical coordinates;

determining, by the processor, a navigation plan based on the corresponding geographical coordinates of the at least one available location and the geographical location of the marine vessel;

identifying, by the processor, an optimal available location of the at least one available location based on one or more selection criteria;

transmitting, by the communication module, the navigation plan to a vessel control system for controlling at least one motor located on the marine vessel to navigate the marine vessel to the optimal available location;

determining, by one of the processor and the vessel control system, a set of thrust vectors based on the navigation plan; and transmitting, by the vessel control system to at least one motor of the marine vessel, the set of thrust vectors; and navigating, by the vessel control system, the marine vessel to the optimal available location;

wherein determining the navigation plan of the at least one available location occurs prior to or after identifying the optimal available location occurs.

7. The method of claim 6, further comprising:

storing, by a storage medium coupled to the processor, the geographical coordinates of the at least one marine location.

8. The method of claim 6, wherein the step of receiving, by the communication module, the geographical location of the marine vessel comprises:

receiving the geographical location from a cloud-based network which receives the geographical location from the vessel control system of the marine vessel.

9. The method of claim 6, wherein the at least one marine location further includes at least one unavailable location for marine vessels.

10. The method of claim 6, wherein the selection criteria comprise i) the navigation plan of each available location, ii) one or both of a size and type of the marine vessel, iii) a marine vessel owner or operator preference, iv) or a combination thereof.

11. The method of claim 6, wherein the geographical location of the marine vessel is based on a global positioning system (GPS), a wide area augmentation system (WAAS)-enabled unit, a local area augmentation system (LAAS)-enabled unit (also known as a ground-based augmentation system (GBAS)), other satellite-based augmentation system (SBAS), or any combination thereof.

12. The marine location management system of claim 6, further comprising:

receiving, by the communication module of a marine location management system, a user's preference of the at least one available location;

comparing, at the marine location management system, the user's preference of the at least one available location with a conflict, wherein the conflict is a safetycondition or an unsuitable location; and overriding the user's preference based on the comparison to the conflict.

13. A marine location management system for remotely navigating a marine vessel, the marine location management system being located remote and separate from the marine vessel and adapted to communicate with a vessel control system of the marine vessel, the marine location management system comprising:

a storage medium adapted to store geographical coordinates of at least one marine location, wherein the at least one marine location is located within at least one of a marina, a mooring field, or a lock;

a communication module adapted to receive a geographical location of the marine vessel; and a processor, in communication with the storage medium and the communication module, adapted to:

determine at least one available location of the at least one marine location to receive the marine vessel, each available location is associated with corresponding geographical coordinates;

determine a navigation plan based on the corresponding geographical coordinates of the at least one available location and the geographical location of the marine vessel; and identify an optimal available location of the at least one available location based on one or more selection criteria;

wherein the vessel control system is configured to control at least one motor located on the marine vessel, the vessel control system further configured:
  (i) to receive the navigation plan corresponding to the optimal available location determined by the processor, wherein one or both of the processor and the vessel control system are configured to determine a set of thrust vectors based on the corresponding geographical coordinates of the optimal available location and the geographical location of the marine vessel; and
  (ii) to control the at least one motor based on the set of thrust vectors to navigate the marine vessel to the optimal available location.

14. The marine location management system of claim 13, wherein the communication module is adapted to receive the geographical location from a cloud-based network which receives the geographical location from the vessel control system of the marine vessel.

15. The marine location management system of claim 13, wherein the at least one marine location further includes at least one unavailable location for marine vessels.

16. The marine location management system of claim 13, wherein the selection criteria comprise i) the navigation plan of each available location, ii) one or both of a size and type of the marine vessel, iii) a marine vessel owner or operator preference, iv) or a combination thereof.

17. The marine location management system of claim 13, wherein the geographical location of the marine vessel is based on a global positioning system (GPS), a wide area augmentation system (WAAS)-enabled unit, a local area augmentation system (LAAS)-enabled unit (also known as a ground-based augmentation system (GBAS)), other satellite-based augmentation system (SBAS), or any combination thereof.

* * * * *